April 3, 1951 D. L. BLANEY 2,547,737

UNIVERSAL MAGNETIC HEAD

Filed Oct. 29, 1948

INVENTOR.
DOROTHY L. BLANEY
BY

Patented Apr. 3, 1951

2,547,737

UNITED STATES PATENT OFFICE 2,547,737

UNIVERSAL MAGNETIC HEAD

Dorothy L. Blaney, Los Angeles, Calif., assignor to Radio Corporation of America, a corporation of Delaware Application October 29, 1948, Serial No. 57,354

5 Claims. (Cl. 179—100.2)

This invention relates to magnetic sound methods and apparatus, and particularly to a single magnetic head or unit which may be used for recording, reproducing, and erasing with substantially equal efficiency.

In the construction of magnetic recording heads, it is well-known that the recording gap is generally of a width of approximately one mil or one thousandths of an inch, a reproducing gap of a width from one-half mil to one mil, while the gap used for erasing in the erase head is approximately ten mils or ten thousandths of an inch in width. However, in the manufacture of many sound recording, reproducing, and erasing heads with such working gaps, a rear gap is provided of a width approximating ten thousandths of an inch.

The present invention, therefore, is directed to a magnetic head which is so constructed that the narrow gap can be used for recording and reproducing, and the wider rear gap can be used for erasing, the gaps, of course, to be used at mutually exclusive times or periods. In other words, the same magnetic head may be adjusted so that the magnetic film or tape passes over the narrow gap and a signal may be recorded thereon, the head being supplied with the signal currents with or without a biasing carrier current. The same head may also be used for erasing simply by rotating the head 180° to bring the wide gap in contact with the magnetic tape and impressing on the head a high frequency erasing current. In this manner, the number of heads used in any recorder or reproducer may be reduced to one instead of the usual two heads, and, in many instances, three heads.

The principal object of the invention, therefore, is to facilitate the recording, reproduction, and erasing of a magnetic sound record.

Another object of the invention is to provide an improved magnetic sound head.

A further object of the invention is to provide an improved method of and system for recording, erasing, and reproducing magnetic sound records.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
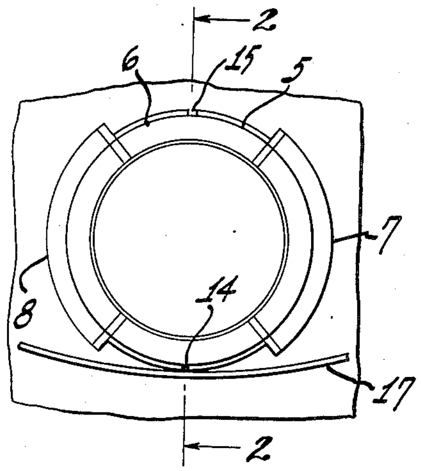
Fig. 1 is a front, elevational view of a magnetic head embodying the invention.
Figure 2:
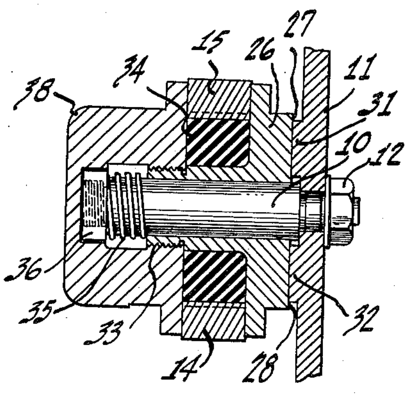
Fig. 2 is a cross-sectional view of the head of Fig. 1, taken along the line 2—2 of Fig. 1.
Figure 3:
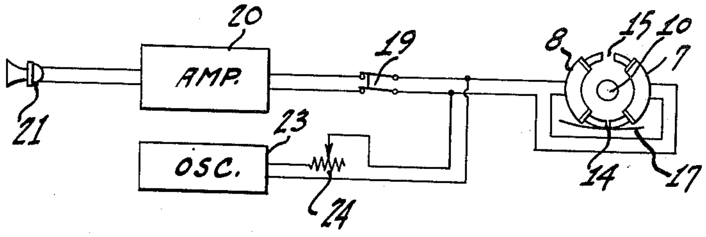
Fig. 3 is a diagrammatic view of a recording system with the new head connected therein.

Referring now to the drawings, in which the same numerals identify like elements, the head of the invention is composed of semi-circular laminated core sections 5 and 6 surrounded by respective windings 7 and 8. The core sections and coils are mounted on a shaft 10 extending through a wall support 11 and fastened by a nut 12. A narrow gap of between one-half to one mil in width is provided by a spacer 14, while a gap of approximately ten mils' width is provided by a spacer 15. A magnetic film or tape 17 is shown in Figs. 1 and 3 in contact with the narrow gap 14.

To use the above described head for recording, the windings 7 and 8 are connected in series over a switch 19 to an amplifier 20, the input to which is connected to a microphone 21 or other signal source. (See Fig. 3.) Also connected to the conductors between the amplifier 20 and the head is an oscillator 23 to supply the usual bias current in a well-known manner, the bias current being under control of a rheostat 24. Thus, to record a magnetic record, the narrow gap 14 is employed, while this gap may also be used for reproduction.

Figure 4:
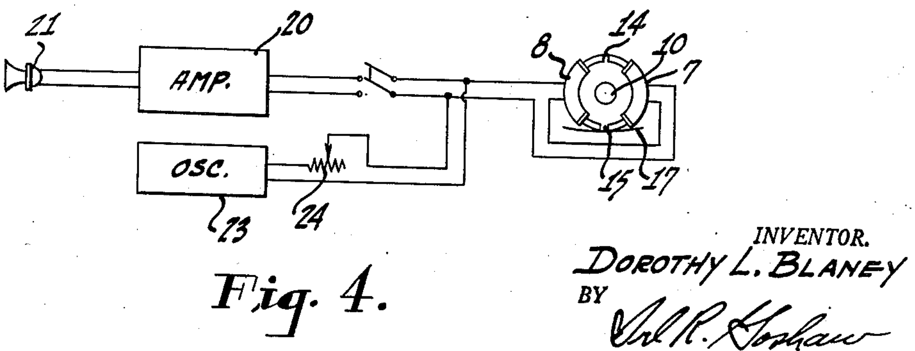
Fig. 4 is a diagrammatic view of the system of Fig. 3, in which the head is connected for the erasing operation.

To erase a magnetic record with the same head, the head is rotated 180°, as shown in Fig. 4, to position the wide gap 15 in contact with the magnetic tape. The same system as in Fig. 3 may be used for erasing, except that the switch 19 is now opened and the oscillator is used for supplying the erasing energy which may be increased to the proper amount by the rheostat 24.

To facilitate the rotation of the head, it is mounted on the shaft 10, upon which is a mounting bracket 26 having its flanged end milled to provide two keyways or notches 27 and 28 in which key extensions 31 and 32 are accommodated. The other end of the bracket is threaded at 33. Mounted on the central section of the bracket is an insulator ring 34 which supports the core sections 5 and 6 and coils 7 and 8.

To maintain the keys 31 and 32 in slots 27 and 28, a coil spring 35 surrounding shaft 10 abuts a shoulder of the bracket 26 and a nut 32 threaded on the shaft 10. A knurled cap 38 is threaded on the bracket 26 at 33. Thus, to rotate the head, it is only necessary to grasp the cap 38, draw it longitudinally of the shaft 10 against the tension of the spring 35, rotate it 180°, and allow it to return to its position, where the opposite slots and keys are again in alignment. This construction is simple and rugged, and will accurately position the gaps 14 and 15, particularly if the keys and slots are tapered.

The above magnetic head, therefore, will permit a magnetic recording, reproducing, and erasing unit to be made extremely small and compact and permit the cost thereof to be much less than units of multiple heads.

I claim:

1. A magnetic head, comprising a two-section core, said core having diametrically opposite gaps, one gap being of a narrow recording width, and the other gap being of a wider erasing width, means for mounting said head for rotation about an axis between said gaps and perpendicular to a plane in which said gaps are located, and means for maintaining said head in either of two rotational positions of operation, said positions being 180° apart.

2. A magnetic head, comprising a two-section core, said core having diametrically opposite gaps, one gap being approximately one mil in width, and the other gap being approximately ten mils in width, means for mounting said head for rotation about an axis between said gaps and perpendicular to a plane in which said gaps are located, and means for maintaining said head in either of two rotational positions of operation, said positions being 180° apart.

3. A magnetic head, comprising a mounting, a pair of semi-circular laminated cores surrounding said mounting, means for providing one gap between said cores of approximately one mil in width, means for providing another gap between said cores of substantially ten mils in width, said gaps being diametrically opposite one another, means for mounting said head for rotation about an axis between said gaps and perpendicular to a plane in which said gaps are located, and means for maintaining said head in two rotational positions 180° apart.

4. A magnetic head in accordance with claim 3, in which said mounting means includes a shaft, a bracket rotatable on said shaft, a pair of keys and slots 180° apart on opposite sides of said shaft, and a coil spring on said shaft for holding said keys and slots in position.

5. A magnetic head in accordance with claim 3, in which said mounting means includes a shaft, means for rotatably mounting said head on said shaft, a key and slot for accurately positioning said head in a certain rotated position, and means for holding said key in said slot.

DOROTHY L. BLANEY.

REFERENCES CITED

The following references are of record in the file of this patent:

UNITED STATES PATENTS

| Number | Name | Date |
|---|---|---|
| 2,351,003 | Camras | June 13, 1944 |
| 2,418,542 | Camras | Apr. 8, 1947 |

FOREIGN PATENTS

| Number | Country | Date |
|---|---|---|
| 221,638 | Switzerland | July 10, 1942 |
| 725,830 | Germany | Sept. 30, 1942 |